United States Patent

[11] 3,602,742

[72] Inventor Ronald G. Husa
Albuquerque, N. Mex.
[21] Appl. No. 838,948
[22] Filed July 3, 1969
[45] Patented Aug. 31, 1971
[73] Assignee The Uited States of America as represented by the Uited States Atomic Energy Commission

[54] CIRCUIT FOR GENERATING A PULSE IN RESPONSE TO A RADIATION BURST
8 Claims, 1 Drawing Fig.

[52] U.S. Cl. 307/278, 250/83.3 R, 250/83.6 R, 307/231, 307/288, 307/308
[51] Int. Cl. H03k 3/00
[50] Field of Search 307/231, 255, 267, 278, 288, 293, 202, 308, 311; 328/1, 2; 250/83.3 R, 83.6 R

[56] References Cited
UNITED STATES PATENTS

| | | | |
|---|---|---|---|
| 3,292,005 | 12/1966 | Lee | 307/255 |
| 3,303,343 | 2/1967 | Glass | 250/83.6 X |
| 3,374,366 | 3/1968 | Kleinberg | 307/288 |
| 3,458,732 | 7/1969 | Robinson | 307/288 X |

OTHER REFERENCES

Pub. I " A Survey of Semiconductor Devices and Circuits in Computers" (Part 2) by Marsocci in Semiconductor Products, January 1961, Pages 31 and 32.

*Primary Examiner*—Stanley D. Miller, Jr.
*Attorney*—Roland A. Anderson

ABSTRACT: A solid state circuit which generates an electrical output pulse upon application of an electrical impulse from a radiation burst detector or of the radiation burst itself and which utilizes a resistance-capacitance regeneration timing loop to activate a saturation holding circuit which causes a trigger circuit to continue conduction to sustain the output pulse from an output circuit for a predetermined time proportional to the resistance-capacitance time constant of the regeneration loop.

PATENTED AUG 31 1971 3,602,742
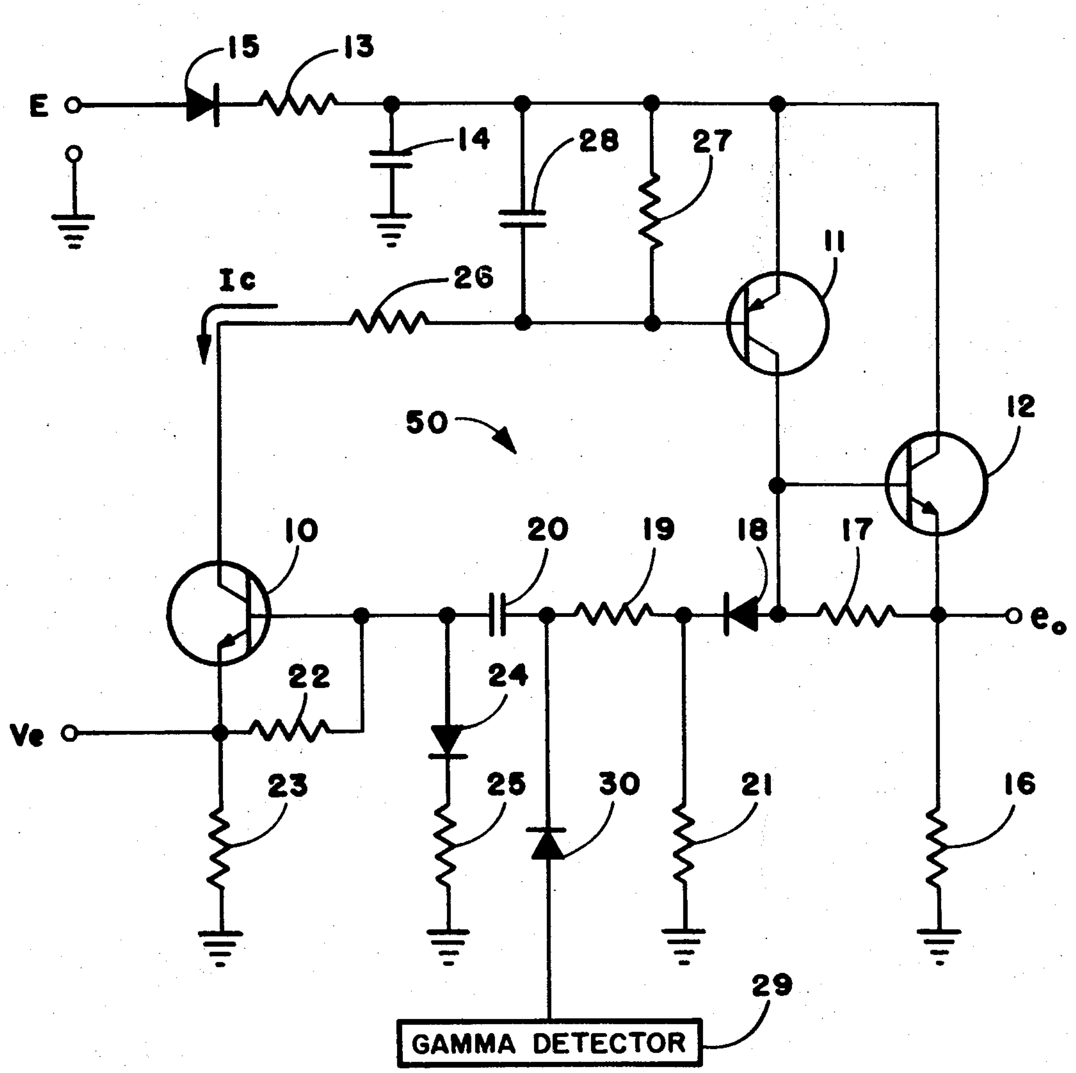
INVENTOR.
RONALD G. HUSA
BY

CIRCUIT FOR GENERATING A PULSE IN RESPONSE TO A RADIATION BURST

BACKGROUND OF THE INVENTION

Various solid state devices, including diodes, transistors, silicon controlled rectifiers, semiconductor switches, field effect transistors, and the like and various other electronic devices, including capacitors and the like are adversely affected in operation by radiation burst, such as alpha, beta, and gamma rays given off by the disintegration or radioactive decay of atomic nuclei. Under the influence of such radiation bursts, these various devices tend to short temporarily and often become permanently degraded in quality of performance.

The disadvantage of this phenomenon can be readily appreciated, especially with respect to solid state switching devices such as silicon controlled rectifiers, switches and the like, since once such devices have switched from a normally open state to a conducting state, they do not automatically return to their original open state without an interruption of the current flowing through the device; a mere removal or adjustment of the potential on the gate or control element of the device after switching will not cause the device to change back to the original open state. Thus, even though a radiation burst impinging upon the device may be of very short duration, it may create a short within the device to start conduction through it and cause an untimely and undesired switch. Of course, this undesirable switch also can be caused by a short in any device sensitive to radiation which controls or supplies a trigger impulse to such switching devices or which performs some similar acute or crucial function.

Radiation caused switching may be particularly undesirable in devices in remote locations not directly monitored and controlled. For example, in a nuclear reactor generating energy to be converted to electrical energy for commercial distribution, it may be important to remotely control the reactor to keep it from going upon "critical excursions," extremely dangerous conditions at which the reaction within the reactor becomes uncontrollable. If the monitoring circuits in proximity to the reactor were made inoperable or subjected to possible failure due to impingent radiation, controlling the reactor may be difficult, if not impossible. Therefore, having a circuit to detect radiation bursts which would adversely affect any control circuits, and which would initiate some means to minimize the effects or to prevent the undesirable effects from occurring altogether is highly desirable. Such circuit may, for example, upon detection of a radiation burst, generate an electrical pulse which may be used to energize or deenergize the circuits which may be affected by the radiation burst to ensure that after the duration of the electrical pulse all the circuits are in the same state as before the radiation burst. This may be accomplished by applying the electrical pulse to a transistorized circuit, or other circuit with a fast switching time, which, in turn, supplies a voltage to the radiation affected circuits to keep normally conducting circuits on, or which opens the normally nonconducting circuits to keep them off. Many other methods of application exist, but are not discussed herein as being a matter of design choice apparent to those skilled in the art. The pulse generated by the circuit must, of course, be of duration longer than the duration of the radiation burst, which may vary depending upon the type of radiation encountered in the particular application.

One particular requirement of the pulse generating circuit is that even though it may utilize solid state devices it must function independently of radiation bursts; that is, even if the components of the detection circuit are affected by radiation bursts, the control circuit must still emit a proper electrical pulse of proper duration under the influence of a radiation burst.

SUMMARY OF THE INVENTION

It is, therefore, an object of the invention to present a circuit which generates an electrical pulse of desired duration in response to a radiation burst or in response to an electrical impulse from a radiation detecting device.

It is a further object of the invention to present a circuit the operation of which is not critically impaired by a radiation burst impingent upon the components thereof.

These and other objects, features, and advantages of the invention will become readily apparent form the following description of the invention, read in conjunction with the attached drawing, and the appended claims.

In accordance with the invention, a circuit is presented which emits an electrical pulse of desired duration in response to a radiation burst or in response to an electrical impulse generated by a radiation burst detector. The circuit utilized means for generating an output pulse having a control element thereof connected through a resistance-capacitance timing circuit to a triggering means to activate the generating means, and, regeneratively coupled to the timing circuit and triggering means, a means for sustaining the triggering means for a duration determined by the timing circuit.

BRIEF DESCRIPTION OF DRAWING

Shown in the drawing is a schematic representation of the electrical configuration of a preferred embodiment of the invention.

DESCRIPTION OF THE PREFERRED EMBODIMENT

As illustrated in the drawing the preferred embodiment of the pulse generating circuit of the invention includes three semiconductor devices, the devices being shown as transistors, 10, 11, and 12. Transistor 12 is the output transistor, connected as an emitter follower to produce an output pulse. Transistor 10 and transistor 11, are the trigger and saturating transistors, respectively, and are connected by a regenerative loop to switch the output pulse on and off and to control its duration.

The transistors and their respective circuits are configured generally as follows. An input voltage E is applied to the collector of output transistor 12 and to the emitter of saturating transistor 11 through a diode 15 connected in series with a resistor 13 having capacitor 14 connected between the low end of resistor 13 and ground, resistor 13 and capacitor 14 acting as a filter circuit to protect the circuit from short power supply dropouts when the circuit is active. The output pulse, illustrated as a voltage $e_o$, is derived from the emitter of output transistor 12, which is connected through load resistor 16 to ground. The base and emitter of the output transistor 12 are connected to a regenerative loop, indicated generally by the reference numeral 50, at the collector of the saturating transistor 11, the base connection being made directly and the emitter connection being made through a series resistor 17.

The regenerative loop 50 interconnects the collector of saturating transistor 11 and the base of trigger transistor 10, and is made up of a diode 18, a resistor 19, and a capacitor 20 connected in series. Resistor 21 connects the junction between the diode 18 and the resistor 19 to ground, and resistor 22 connects the junction between the base of trigger transistor 10 and the capacitor 20 to ground through emitter resistor 23. The primary purpose of the resistors 21 and 22 is to complete the discharge paths for capacitor 20, so that after the circuit is once fired, the capacitor will be discharged and the circuit will recover to detect subsequent radiation bursts. Also, connected to ground from the junction between the base of the trigger transistor 10 and the capacitor 20 is a diode 24 and a resistor 25 connected in series. This series combination is a potential sensing circuit to stabilize the point at which trigger transistor 10 stops conducting. The base of saturating transistor 11 is connected to the collector of the trigger transistor 10 by a resistor 26, and the base and emitter of saturating transistor 11 are interconnected by a resistor 27 and a capacitor 28 in parallel. The capacitor 28 functions to swamp out the emitter capacitances during transient conditions of the applied voltage E, and the resistor 27 serves to stabilize the saturating transistor 11. In operation, a bias voltage $V_e$ may be applied to the emitter of trigger transistor 10, the various other biases of the transistors being derived from input voltage E through the various circuit components. By proper choice of resistance (not shown) the bias voltage upon the emitter trigger transistor 10 may be also derived from input voltage E. This latter method is desirable if the input voltage E is susceptible to voltage variations since it may be desirable to maintain the emitter voltage on transistor 10 at a fixed, predetermined value with respect to input voltage E. The three transistors are normally in a nonconducting or "off" state. When an electrical impulse, such as an impulse created by a gamma detector or other radiation sensing device, is applied to a point within the regeneration loop, the circuit is activated. The electrical impulse may be derived from any radiation sensing device which transduces a radiation burst into an electrical impulse, such as a Geiger-Mueller tube, photodiode or other such devices well known in the art. Since as a practical matter radiation encountered in most applications involves gamma rays, which are inherently faster than most typically encountered radiation, it is usually desirable that the radiation sensing device be a gamma detector, as illustrated by the gamma detector 29 in the drawing, thereby to cause the circuit to trigger as soon as possible before the arrival of more damaging neutron or other radiation which may accompany the radiation burst. Of course, in rare instances in which only alpha, or beta, or other pure radiation is encountered, a detector for that type radiation may be substituted for the gamma detector illustrated. For illustration, the electrical impulse derived at the output of gamma detector 29 is applied to the regeneration loop 50 by isolation diode 30.

An additional advantage of the circuit of the invention is that the electrical impulse input may be applied anywhere in the regeneration loop 50, or anywhere in the base circuit of saturating transistor 11, with appropriate polarity and amplitude adjustments.

When the radiation produced electrical impulse is applied to the regeneration loop, trigger transistor 10 conducts a current, designated by an arrow labeled $I_c$, which causes saturating transistor 11 to conduct, which, in turn, causes the output transistor 12 to conduct and deliver an output voltage $e_o$. As current $I_c$ flows through trigger transistor 10, a second current flows through saturating transistor 11, through the regeneration loop 50, and through the emitter circuit of trigger transistor 10 to ground. The currents continue to flow until the charging current through capacitor 20 decreases to a point which will no longer maintain a loop gain greater than one, thus turning off transistor 10 and 11. A diode 24 is connected in series with a resistor 25, the combination interconnecting the base of trigger transistor 10 and ground to provide a current shunt, and temperature compensating diode element to cancel out the variation of the base-emitter junction of transistor 10.

The duration of the output pulse voltage $e_o$ is determined by the time constant of the regeneration loop 50, defined by the capacitor 20, the resistances in the circuit, and the values of Beta (the common-emitter forward-current transfer ratio of a transistor) of the particular transistor used. One particular feature, however, of the illustrated preferred embodiment is that although the Betas of the respective transistors have an effect on the time constant of the regenerative loop 50, it is practically negligible with the particular circuit configuration and component values presented. Consequently, in operation should a transistor be degraded due to an impinging radiation burst to such a degree as to appreciably change the Beta of the transistor, the duration of the output pulse will not be significantly affected.

To be understood is that although transistors 10 and 12 are shown as an NPN-type, and transistor 11 is shown as a PNP-type, any type of semiconductor may be used in the illustrated circuit with simple modifications and biasing adjustments well known in the semiconductor art. If different types of transistors are used, the respective Betas may be easily compensated for with minor adjustments to the NPN-type, of the circuit components.

As mentioned above, radiation bursts depending on the level or intensity thereof may cause transistors, rectifiers, capacitors and various other devices to temporarily short as the radiation strikes them. This is true also for the components of the circuit of the invention; however, one of the important features of the invention is that even though a radiation pulse does cause any transistor, capacitor, or rectifier to short, the circuit will still operate. With the exception of filter capacitor 14, any element which shorts, for any reason, will cause the entire circuit to operate, just as if the circuit had been properly triggered. Hence, the circuit will properly function even if the electrical impulse from gamma detector 29 should fail. The inclusion of the gamma detector, however, defines the precise radiation level which will trigger the circuit, since the exact level and time at which a radiation burst impinging upon the circuit causes an element in the circuit to short is uncertain and not totally reliable. However, if filter capacitor 14 were to short, the entire circuit would fail. Hence, if such filter capacitor is used (it may be omitted if a completely reliable and constant voltage source E is used) it must of a kind which will not short upon being subjected to a radiation burst, preferably such as a ceramic capacitor or the like.

Typical values for parts used in the circuit are listed in Table I below. These values, however, are given only as a single example of the circuit used to obtain an output pulse of 12 milliseconds, and it is understood that various ones of the values may be modified to obtain different output pulse lengths, and, additionally, to utilize different operating voltages, and to compensate for the type and kinds of transistors use, without departing from the spirit of the invention.

TABLE I

| | |
|---|---|
| For operating voltages of $E$=9.2V | |
| trigger transistor 10 | 2N4251 |
| saturating transistor 11 | 2N4872 |
| output transistor 12 | 2N4251 |
| resistor 13 | 2 ohms |
| capacitor 14 | 2 μF. |
| diode 15 | FDH600 |
| resistor 16 | 100 ohms |
| resistor 17 | 1K ohms |
| diode 18 | FD200 |
| resistor 19 | 150 ohms |
| capacitor 20 | 56 μF. |
| resistor 21 | 1K ohms |
| resistor 22 | 5.1K ohms |
| resistor 23 | 100 ohms |
| diode 24 | FD 700 |
| resistor 25 | 300 ohms |
| resistor 26 | 510 ohms |
| resistor 27 | 1K ohms |
| capacitor 28 | 100 pf. (picofarad) |

Although the invention has been illustrated and described with a certain degree of particularity, to be understood is that the present disclosure is made only by way of example and that numerous changes in the details of construction and the combination and arrangement of parts may be restored to without departing from the spirit and scope of the invention.

What is claimed is:

1. A solid state pulse generator circuit capable of self-activating or external activating in response to a radiation burst and continuing to operate during said bust with a pulse output substantially constant regardless of environment comprising a resistance-capacitance timing circuit, transistor means for generating an output pulse, said generating means having a control element thereof connected to said timing circuit and activated by a current therein, transistor triggering means for initiating a current in said timing circuit in response to said radiation burst to activate said generating means, means for sustaining said current of said triggering means for the desired duration of said output pulse, said sustaining means being regeneratively coupled to said triggering means by said timing circuit and resistive means in each current discharge path of said circuit for limiting flow of current through each of said circuit elements.

2. The generator of claim 1 further comprising means for discharging the capacitor of said timing circuit after termination of the output pulse.

3. The generator of claim 1 further comprising a filter circuit connected to an input voltage source including a ceramic capacitor connected between said voltage source and ground to prevent instantaneous variations of said voltage source from affecting the operation of said generator, said capacitor being resistant to said radiation burst.

4. The generator of claim 1 further comprising a potential sensing circuit connected between said triggering means and a ground potential, said sensing circuit being operable to assure that said triggering means ceases conduction at the termination of the desired output pulse duration.

5. The generator of claim 1 wherein said sustaining means includes a transistor regeneratively coupled to said timing circuit and triggering means and further comprising a capacitance swamping circuit connected between the emitter and the base of said transistor of said sustaining means.

6. The generator of claim 1 wherein the transistor of said generating means is connected as an emitter follower with its base connected to said timing circuit.

7. The generator of claim 1 wherein the collector of said transistor of said sustaining means and the base of said transistor of said triggering means are interconnected by said timing circuit.

8. The pulse generator of claim 8 wherein said generating means comprises a first NPN transistor having an emitter, base, and collector, said output pulse being derived at the emitter of said first NPN transistor; said sustaining means comprises a PNP transistor having an emitter, base, and collector, the emitter of said PNP transistor being connected to the collector of said first NPN transistor, and the collector of said PNP transistor being connected to the base of said first NPN transistor; said triggering means comprises a second NPN transistor having an emitter, base and collector; and said timing circuit comprises a first resistor, a capacitor, and a diode connected in series between the collector of said PNP transistor and the base of said second NPN transistor; and further comprising a second resistor connecting the emitter of said first NPN transistor to a ground potential; a third resistor interconnecting the base to the emitter of said first NPN transistor; a fourth resistor interconnecting the base and the emitter of said PNP transistor; a fifth resistor connecting the emitter of said second NPN transistor to a ground potential; a sixth resistor interconnecting the base of said PNP transistor and the collector of said second NPN transistor; two discharge resistors, each connecting one side of said capacitor of said timing circuit to a ground potential; and a potential sensing circuit comprising a diode and a seventh resistor connected in series, and connecting the base of said second NPN transistor to a ground potential, whereby when an input voltage is applied to said emitter of said PNP transistor and biasing voltages are applied to the emitter, of said second NPN transistor, and an input pulse is applied between the capacitor and first resistor of said timing circuit and any other point of the circuit, a voltage pulse of duration proportional to the time constant of said resistor and said capacitor in said timing circuit is produced at the emitter of said first NPN transistor.